United States Patent [19]
Zulu

[11] Patent Number: 6,039,133
[45] Date of Patent: Mar. 21, 2000

[54] STEERING CONTROL SYSTEM FOR AN ARTICULATING WORK MACHINE HAVING A STEERING FLUID CYLINDER AND A FLUID-POWERED DIFFERENTIAL

[76] Inventor: Joshua Zulu, Ave Jules Hardouin Mansart 18, 1410 Waterloo, Belgium

[21] Appl. No.: 08/971,410

[22] Filed: Nov. 17, 1997

[51] Int. Cl.⁷ .................................................. B62D 11/00
[52] U.S. Cl. ...................... 180/6.64; 180/6.3; 180/403; 180/419
[58] Field of Search ..................... 180/403, 418, 180/419, 6.64, 6.3, 6.4, 6.44, 6.62

[56] References Cited

U.S. PATENT DOCUMENTS

| | | | |
|---|---|---|---|
| 3,151,694 | 10/1964 | Rogers | 180/6.64 |
| 3,783,963 | 1/1974 | Erwin | 180/6.3 |
| 3,865,208 | 2/1975 | Crawshay et al. | 180/6.64 |
| 4,019,603 | 4/1977 | Unruh et al. | 180/134 |
| 4,420,991 | 12/1983 | Meyerle | 180/6.44 |
| 4,905,783 | 3/1990 | Bober | 180/142 |
| 4,940,106 | 7/1990 | Pederson et al. | 180/139 |
| 5,234,069 | 8/1993 | Krone et al. | 180/135 |
| 5,249,639 | 10/1993 | Marr et al. | 180/133 |
| 5,258,912 | 11/1993 | Ghoneim et al. | 364/424 |
| 5,307,888 | 5/1994 | Urvoy | 180/6.2 |
| 5,307,892 | 5/1994 | Phillips | 180/79.1 |
| 5,323,866 | 6/1994 | Simard et al. | 180/6.28 |
| 5,489,005 | 2/1996 | Marcott et al. | 180/405 |
| 5,520,262 | 5/1996 | Marcott | 180/418 |
| 5,529,136 | 6/1996 | Zulu | 180/6.44 |

*Primary Examiner*—Daniel G. DePumpo
*Attorney, Agent, or Firm*—Maginot & Addison

[57] ABSTRACT

An articulating work machine, such as a scraper, wheel loader, or truck, is disclosed. The articulating work machine includes a fluid-powered differential and a pair of fluid-powered steering cylinders. The fluid-powered differential and the steering cylinders cooperate so as to steer the articulated work machine during advancement thereof. Moreover, the articulating work machine includes a number of rotational position and speed sensors for detecting operating parameters associated with the work machine. Such parameters are monitored by a processor in order to control operation of the work machine.

15 Claims, 2 Drawing Sheets

STEERING CONTROL SYSTEM FOR AN ARTICULATING WORK MACHINE HAVING A STEERING FLUID CYLINDER AND A FLUID-POWERED DIFFERENTIAL

TECHNICAL FIELD OF THE INVENTION

The present invention relates generally to an articulating work machine, and more particularly to a steering control system for an articulating work machine having a steering fluid cylinder and a fluid-powered differential.

BACKGROUND OF THE INVENTION

Articulating work machines, such as scrapers, wheel loaders, and trucks, generally include a front frame structure and a rear frame structure which pivot relative to one another in order to steer the work machine during operation thereof. Typically, a number of fluid cylinders are secured at one end to the front frame structure, and at a second end to the rear frame structure. Such fluid cylinders are generally operator controlled hydraulic cylinders in which selective extension and retraction thereof cause the front frame structure to pivot relative the rear frame structure thereby allowing the operator to steer the work machine during advancement thereof.

Moreover, a number of fluid-powered differential assemblies have heretofore been designed for steering an articulating work machine. Use of such fluid-powered differential assemblies is advantageous in that power may be continuously supplied to the wheels of the articulating work machine during articulation thereof. Such an advantage is not present in a number of work machine designs utilizing only hydraulic cylinder articulation arrangements.

It would be desirable to provide a steering control system for an articulating work machine which controls both a number of steering fluid cylinders along with a fluid-powered differential assembly. Moreover, what is further needed is such a steering control system which includes a backup system for steering the articulating work machine in the unlikely event of a hydraulic power failure.

DISCLOSURE OF THE INVENTION

In accordance with a first embodiment of the present invention, there is provided an articulating work machine. The work machine includes a frame assembly having a first frame structure and a second frame structure. The first frame structure supports a first axle assembly having a first set of wheels secured thereto. Moreover, the first frame structure is pivotally secured to the second frame structure. The frame assembly is positionable between an articulated orientation and an aligned orientation. The work machine also includes a fluid cylinder having a first end secured to the first frame structure and a second end secured to the second frame structure. The fluid cylinder is positionable between an extended orientation and a neutral orientation. The work machine further includes a fluid-powered differential secured to the second frame structure. The fluidpowered differential includes a first half shaft and a second half shaft having a second set of wheels secured thereto. The fluid powered differential operates in either a first differential mode of operation in which the fluid-powered differential causes the first half shaft to rotate at the same speed relative to the second half shaft, or a second differential mode of operation in which the fluid-powered differential causes the first half shaft to rotate at a different speed relative to the second half shaft. Moreover, the work machine includes a steering control circuit for controlling direction of travel of the articulating work machine. Operating the steering control circuit in a first steering mode of operation causes the fluid cylinder to be positioned in the extended orientation and the fluid-powered differential to operate in the second differential mode of operation whereby the frame assembly is positioned in the articulated orientation, whereas operating the steering control circuit in a second steering mode of operation causes the fluid cylinder to be positioned in the neutral orientation and the fluid-powered differential to operate in the first differential mode of operation whereby the frame assembly is positioned in the aligned orientation.

In accordance with a second embodiment of the present invention, there is provided an articulating work machine. The work machine includes a frame assembly having a first frame structure and a second frame structure. The first frame structure supports a first axle assembly having a first set of wheels secured thereto. Moreover, the first frame structure is pivotally secured to the second frame structure. The frame assembly is positionable between an articulated orientation and an aligned orientation. The work machine also includes a fluid cylinder having a first end secured to the first frame structure and a second end secured to the second frame structure. The fluid cylinder is positionable between an extended orientation and a neutral orientation. The work machine further includes a fluid-powered differential secured to the second frame structure. The fluid-powered differential includes a first half shaft and a second half shaft having a second set of wheels secured thereto. The fluid powered differential operates in either a first differential mode of operation in which the fluid-powered differential causes the first half shaft to rotate at the same speed relative to the second half shaft, or a second differential mode of operation in which the fluid-powered differential causes the first half shaft to rotate at a different speed relative to the second half shaft. Moreover, the work machine includes a steering control circuit for detecting when an actual angle of articulation between the first frame structure and the second frame structure equals a threshold angle of articulation and preventing the actual angle of articulation from increasing beyond the threshold angle of articulation.

In accordance with a third embodiment of the present invention, there is provided an articulating work machine. The work machine includes a frame assembly having a first frame structure and a second frame structure. The first frame structure supports a first axle assembly having a first set of wheels secured thereto. Moreover, the first frame structure is pivotally secured to the second frame structure. The frame assembly is positionable between an articulated orientation and an aligned orientation. The work machine also includes a fluid cylinder having a first end secured to the first frame structure and a second end secured to the second frame structure. The fluid cylinder is positionable between an extended orientation and a neutral orientation. The work machine further includes a fluid-powered differential secured to the second frame structure. The fluid-powered differential includes a first half shaft and a second half shaft having a second set of wheels secured thereto. The fluid powered differential operates in either a first differential mode of operation in which the fluid-powered differential causes the first half shaft to rotate at the same speed relative to the second half shaft, or a second differential mode of operation in which the fluid-powered differential causes the first half shaft to rotate at a different speed relative to the second half shaft. Moreover, the work machine includes a steering control circuit for detecting speed of the work machine and limiting a rate of change of a threshold angle of articulation based on the speed of the work machine.

BEST MODE FOR CARRYING OUT THE INVENTION

Figure 1:
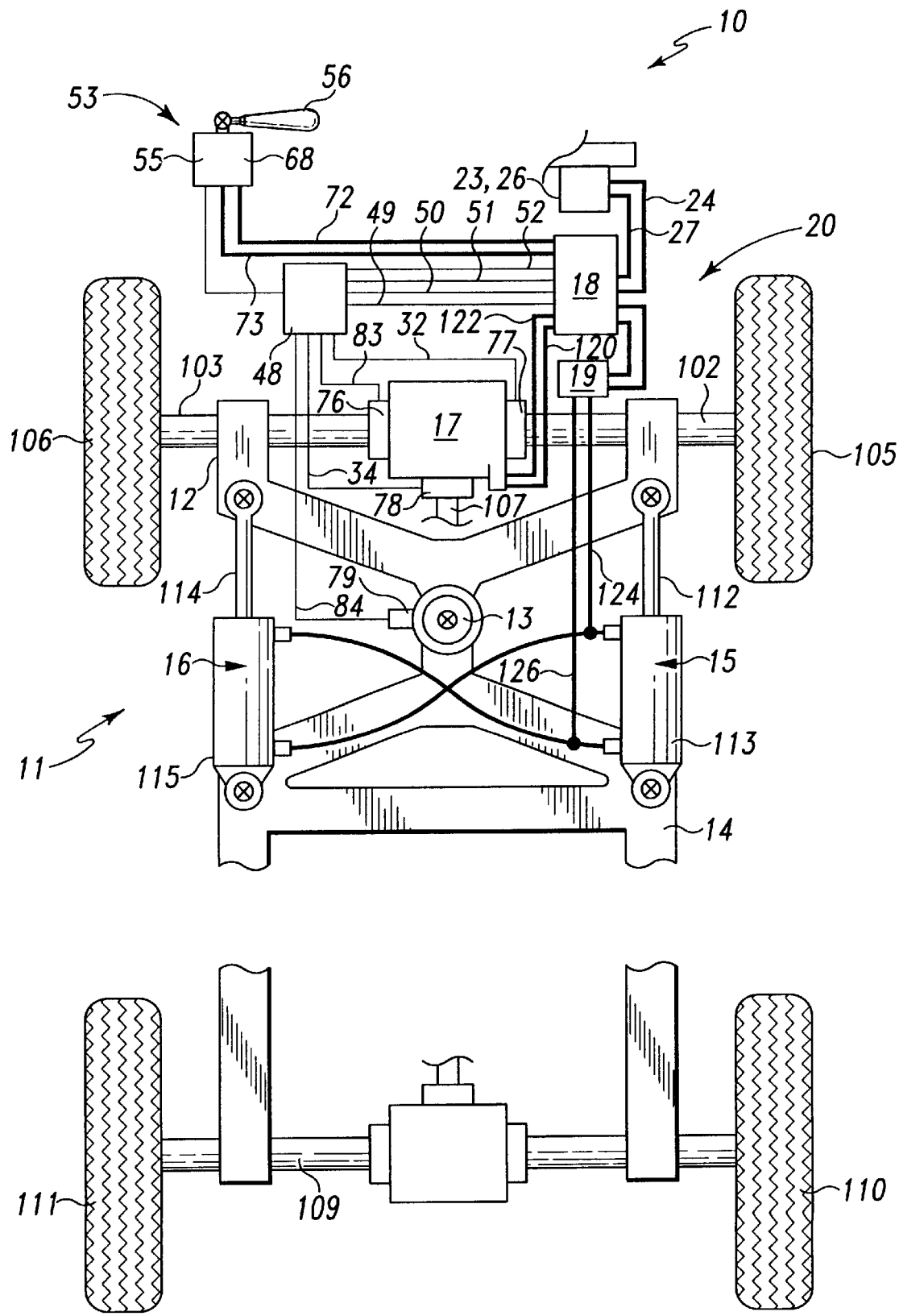
FIG. 1 is a diagrammatic view of an articulating work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
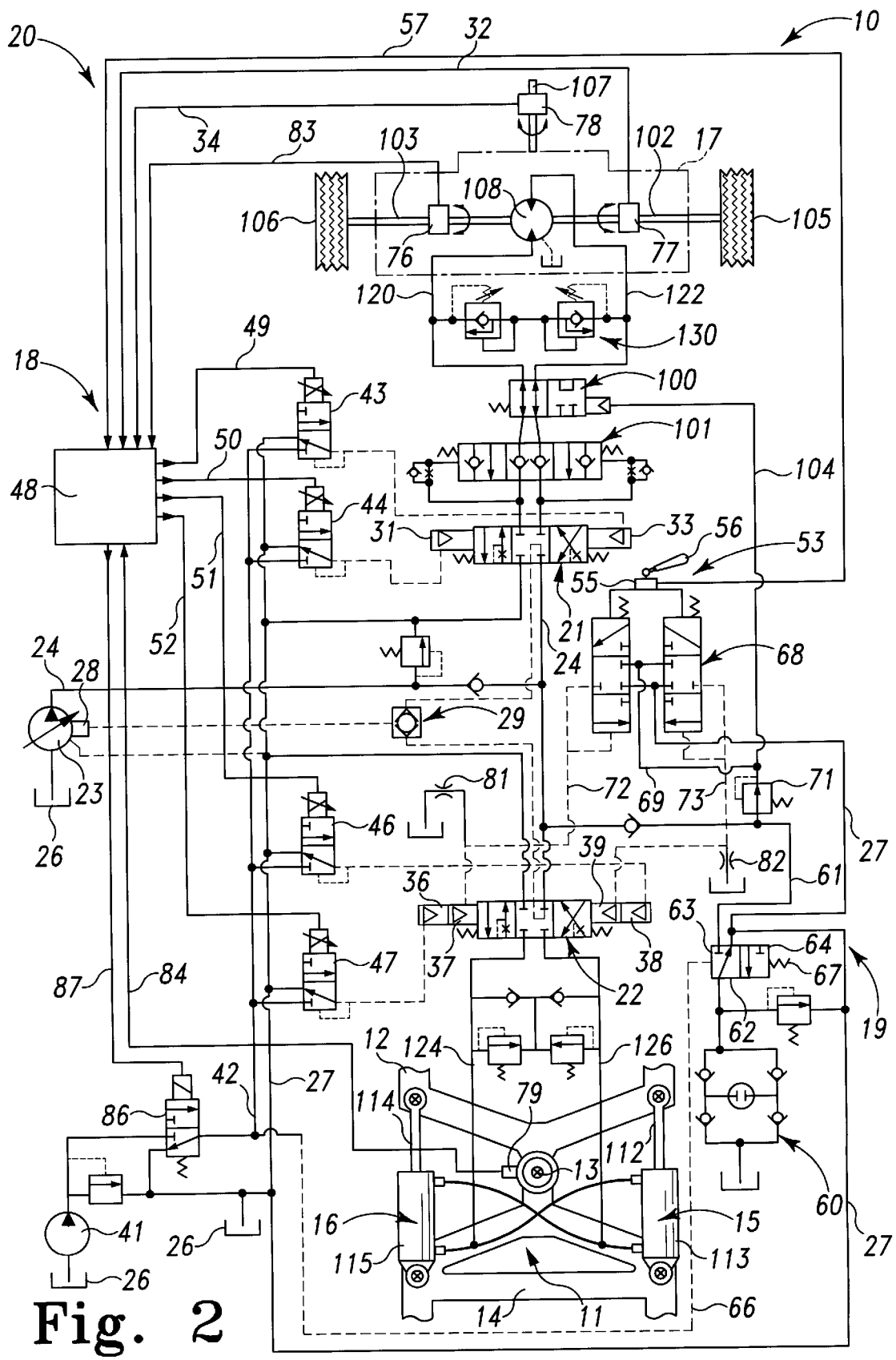
FIG. 2 is a schematic view of the steering control system of the articulating work machine of FIG. 1.

Referring now to FIGS. 1 and 2, there is shown an articulating work machine 10, such as a scraper, wheel loader, or truck. The work machine 10 includes a front frame structure 12 and a rear frame structure 14. The rear frame structure 14 is pivotally coupled to the front frame structure 12 at a pivot point 13, and includes a rear axle 109 having a pair of wheels 110, 111 secured thereto. Collectively, the front frame structure 12 and the rear frame structure 14 are referred to as a frame assembly 11 of the work machine 10. The frame assembly 11 is positionable in an aligned orientation (such as shown in FIG. 1) in which the front frame structure 12 is aligned with the rear frame structure 14 thereby allowing the work machine 10 to advance in a straight direction. Alternatively, the frame assembly 11 is positionable in an articulated orientation in which the front frame structure 12 is articulated (i.e. not aligned) relative the rear frame structure 14 thereby causing the work machine 10 to turn during advancement thereof.

The work machine 10 further includes a pair of fluid or hydraulic cylinders 15, 16, a fluid- or hydraulic-powered differential 17, and a steering control circuit 20. As shown in FIG. 2, the steering control circuit 20 includes a primary steering control circuit 18, and a backup steering control circuit 19.

The hydraulic-powered differential 17 includes a pair of half shafts 102 and 103 which have a pair of wheels 105 and 106 secured thereto, respectively. The hydraulic-powered differential 17 includes an input shaft 107 having a rotary speed sensor 78 secured thereto. As shall be discussed in more detail below, the rotary speed sensor 78 may be used to detect rotational speed of the input shaft 107.

The hydraulic-powered differential 17 further includes a rotary motor 108 which is operatively coupled to the half shafts 102, 103. As discussed below in more detail, the rotary motor 108 may be used to selectively increase rotational speed of one of the half shafts 102, 103 while simultaneously decreasing rotational speed of the other half shaft 102, 103 thereby causing the front frame structure 12 to articulate relative to the rear frame structure 14. In particular, if the hydraulic-powered differential is operated in a right-hand mode of operation in which rotational speed of the half shaft 103 is increased while rotational speed of the half shaft 102 is simultaneously decreased, the work machine 10 will executed a right-hand turn. Conversely, if the hydraulic-powered differential is operated in a left-hand mode of operation in which rotational speed of the half shaft 102 is increased while rotational speed of the half shaft 103 is simultaneously decreased, the work machine 10 will executed a left-hand turn. Moreover, if the hydraulic-powered differential is operated in a straight-advancement mode of operation, the half shafts 102, 103 are operated at the same rotational speed relative one another. One hydraulic-powered differential which is suitable for use as the hydraulic-powered differential 17 of the present invention is disclosed in commonly assigned U.S. Pat. No. 5,529,136 the disclosure of which is hereby incorporated by reference.

The hydraulic cylinders 15, 16 are secured to the frame assembly 11. In particular, a rod 112 of the hydraulic cylinder 15 is secured to the front frame structure 12, whereas a housing 113 of the hydraulic cylinder 15 is secured to the rear frame structure 14. Similarly, a rod 114 of the hydraulic cylinder 16 is secured to the front frame structure 12, whereas a housing 115 of the hydraulic cylinder 16 is secured to rear frame structure 14. It should be appreciated that when the work machine 10 is positioned in the aligned orientation, each of the hydraulic cylinders 15, 16 are positioned in a neutral orientation, as shown in FIGS. 1 and 2. Alternatively, when the work machine 10 is positioned in the articulated orientation, the hydraulic cylinders 15, 16 are selectively positioned in either an extended orientation in which the rods 112, 114 are urged out of the housings 113, 115, respectively, or a retracted orientation in which the rods 112, 114 are urged into the housings 113, 115, respectively. In particular, in order to execute a right-hand turn, the hydraulic cylinder 15 is positioned in the retracted orientation, whereas the hydraulic cylinder 16 is positioned in the extended orientation. Conversely, in order to execute a left-hand turn, the hydraulic cylinder 16 is positioned in the retracted orientation, whereas the hydraulic cylinder 15 is positioned in the extended orientation.

The primary steering control circuit 18 is provided to control both (1) the mode of operation of the hydraulic-powered differential 17, and (2) the orientation of the hydraulic cylinders 15, 16. In particular, the primary steering control circuit 18 includes a pair of pilot operated steering control valves 21, 22 which are in fluid communication with the hydraulic-powered differential 17, and the hydraulic cylinders 15, 16, respectively. In particular, a pair of fluid ports associated with steering control valve 21 are coupled to a pair of fluid ports associated with the rotary motor 108 via a pair of fluid lines 120 and 122. As shown in FIG. 2, a directional flow control valve 101, a pilot valve 100, and a counter balance valve assembly 130 are disposed in the fluid lines 120, 122 in a location that is between the steering control valve 21 and the rotary motor 108.

Similarly, a fluid port associated with steering control valve 22 is coupled to (1) a head end of the hydraulic cylinder 16, and (2) a rod end of the hydraulic cylinder 15 via a fluid line 124. Moreover, a fluid port associated with steering control valve 22 is coupled to (1) a head end of the hydraulic cylinder 15 and (2) a rod end of the hydraulic cylinder 16 via a fluid line 126.

Moreover, both of the steering control valves 21,22 are coupled to a load sensing variable displacement pump 23 via a supply conduit 24, and to a reservoir 26 via an exhaust conduit 27. The pump 23 has a displacement controller 28 which is in fluid communication with a load sensing network 29 which is connected to both of the steering control valves 21, 22 for directing the highest load pressure in the hydraulic-powered differential 17 and the hydraulic cylinders 15, 16 to the displacement controller 28 in a usual manner.

The steering control valve 21 has a first actuating chamber 31 at one end thereof, and a second actuating chamber 33 at the other end thereof. Whereas, the steering control valve 22 has a first pair of actuating chambers 36, 37 at one end thereof, and a second pair of actuating chambers 38, 39 at the other end thereof.

The primary steering control circuit 18 further includes a pilot pump 41 coupled to a pilot supply line 42, a plurality of electrohydraulic proportional valves 43, 44, 46, 47 coupled to the pilot supply line 42, and a processor 48 electrically coupled to the proportional valves 43, 44, 46, 47 through a plurality of electrical signal lines 49, 50, 51, 52, respectively.

The proportional valves 43, 44 are in fluid communication with the actuating chambers 33, 31, respectively, of the steering control valve 21. Similarly, the proportional valves 46, 47 are in fluid communication with the actuating chambers 38, 36, respectively, of the steering control valve 22.

A manual steering actuator 53 includes a position sensor 55 operatively coupled to a control handle 56. The position sensor 55 is electrically coupled to the processor 48 through an electrical signal line 57. Moreover, the speed sensor 78 is electrically coupled to the processor 48 via an electrical signal line 34 thereby allowing the speed sensor 78 to communicate data indicative of rotational speed of the input shaft 107 to the processor 48. In addition, the half shafts 102, 103 have a pair of rotational speed sensors 77, 76 operatively coupled thereto, respectively, so as to measure rotational speed of the half shafts 102, 103, respectively. The speed sensors 76, 77 are electrically coupled to the processor 48 via a pair of electrical signal lines 83, 32, respectively, thereby allowing the speed sensors 76, 77 to communicate data indicative of rotational speed of the half shafts 102, 103, respectively, to the processor 48.

The work machine 10 also includes an articulated angle sensor 79 which is operatively coupled to the pivot point 13 in order to measure an actual angle of articulation between the front frame structure 12 and the rear frame structure 14. The articulated angle sensor 79 is electrically coupled to the processor 48 via an electrical signal line 84 thereby allowing the articulated angle sensor 79 to communicate data indicative of the actual articulated angle of the front frame structure 12 relative to the rear frame structure 14. It should be appreciated that numerous other speed, position, and pressure sensors (not shown) may be operatively coupled to various other components of the steering control circuit 18 and electrically coupled to the processor 48 in order to transmit electrical signals thereto.

The processor 48 processes the input signals from the position sensor 55, the speed sensors 76, 77, 78, and the articulated angle sensor 79 in order to control the position of the proportional valves 43, 44, 46, 47. In particular, if the operator of the work machine 10 positions the control handle 56 so as to steer the work machine 10 in a right-hand direction, the processor 48 receives an output signal commensurate with the direction (i.e. right) and the degree of the right-hand turn from the position sensor 55. Thereafter, the processor 48 generates an output signal on the signal lines 49 and 51. The output signal on the signal line 49 actuates the proportional valve 43 thereby controllably directing pilot pressure to the actuation chamber 33 in order to move the steering control valve 21 leftwardly. At such a leftward position, the steering control valve 21 directs pressurized operation fluid from the supply line 24 through the directional flow control valve 101, the pilot valve 100, and to the hydraulic-powered differential 17 via the fluid line 120 thereby increasing rotational speed of the half shaft 103 and hence the wheel 106 while simultaneously decreasing rotational speed of the half shaft 102 and hence the wheel 105. The difference in traction caused by the varying rotational speeds of the half shafts 102, 103 cause the front frame structure 12 to pivot about the pivot point 13 thereby causing the work machine 10 to execute a right-hand turn. Simultaneously, the output signal on the signal line 51 actuates the proportional valve 46 thereby controllably directing pilot pressure to the actuation chamber 38 in order to move the steering control valve 22 leftwardly. At such a leftward position, the steering control valve 22 directs pressurized operation fluid from the supply line 24 to the head end of the hydraulic cylinder 16 and the rod end of the hydraulic cylinder 15 via the fluid line 124. Such pressurized operation fluid causes the hydraulic cylinder 16 to assume the extended orientation, whereas the hydraulic cylinder 15 assumes the retracted position thereby causing the front frame structure 12 to pivot about the pivot point 13 thereby causing the work machine 10 to execute a right-hand turn.

It should be appreciated that specific machine parameters, as measured by the position sensor 55, the speed sensors 76, 77, 78, and the articulated angle sensor 79, are useful in facilitating operation of the work machine 10. In particular, rotational speed of the half shafts 102, 103 and the input shaft 107 may be used to determine the speed of advancement of the work machine 10. The articulated angle sensor 79 provides data to the processor 48. The processor 48 then determines a threshold rate of change of the angle of articulation of the work machine at a particular point in time based on the data provided by the articulated angle sensor 79. The work machine 10 then limits the actual angle of articulation to a magnitude less than the threshold angle of articulation. In particular, the processor 48 adjusts the magnitude of the output signals on the signal lines 49, 50, 51, 52 in order to alter the allowable rate of change of the angle of articulation of the work machine 10 at that point in time.

Moreover, the processor 48 controls the actual angle of articulation of the work machine 10 so that it does not exceed a predetermined maximum angle of articulation. In particular, the articulated angle sensor 79 provides data to the processor 48. This data includes a measured or actual angle of articulation of the work machine 10. The processor 48 then compares the actual angle of articulation to the predetermined maximum angle of articulation. If the actual angle of articulation is equal to the maximum angle of articulation, the processor 48 adjusts the magnitude of the output signals on the signal lines 49, 50, 51, 52 thereby preventing the actual angle of articulation of the work machine 10 from exceeding the predetermined maximum angle of articulation.

The backup steering control circuit 19 provides steering control to the work machine 10 in the unlikely event that the primary steering control circuit 18 fails or is otherwise rendered inoperable.

In particular, the backup steering control circuit 19 includes a ground driven or electric pump 60 coupled to the supply conduit 24 through an auxiliary supply conduit 61. A pilot operated diverter valve 62 is disposed in the auxiliary supply conduit 61 and has opposite ends 63, 64. A pilot line 66 couples the pilot supply line 42 to the end 63 of the diverter valve 62. A spring 67 is connected to the end 64 of the diverter valve 62.

The backup steering control circuit 19 further includes a pilot control valve 68 which is coupled to the auxiliary supply conduit 61 through a branch conduit 69 having a pressure reducing valve 71 disposed therein. The pilot control valve 68 is coupled to the actuating chambers 37, 39 of the second steering control valve 22 via a pair of pilot lines 72, 73 respectively. The control handle 56 is operatively coupled to the pilot control valve 68 for manual actuation thereof. Moreover, as shown in FIG. 2, a pair of bleed orifices 81, 82 are individually disposed between the pilot lines 72, 73, respectively, and the reservoir 26.

An actuation chamber associated with the pilot valve 100 is coupled to the branch conduit 69 via a pilot line 104. Hence, pilot pressure in the branch conduit 69 causes the pilot valve 100 to assume an actuated position thereby isolating the hydraulic-powered differential 17 from the supply line 24.

A solenoid actuated selector valve 86 is electrically coupled to the processor 48 through an electrical signal line 87 and is resiliently biased to a position at which the pilot supply line 42 is vented to the exhaust conduit 27 and hence the reservoir 26. The selector valve 86 is provided for rendering the backup steering control circuit 19 inoperative when the primary steering control circuit 18 is operative. In particular, the processor 48 continuously monitors the signals from the work machine's sensors (i.e. the position sensor 55, the speed sensors 76, 77, 78, the angle sensor 79, and any other sensor associated with the work machine 10) in order to determine if each of the measured values associated therewith are within a respective predetermined parameter. If all of such signals are within their respective predetermined parameters thereby indicating that the primary steering control circuit 18 is operational, the processor 48 generates a control signal which is sent to the selector valve 86 thereby urging the selector valve 86 to a position in which pilot pressure is communicated through the pilot supply line 42 from the pilot pump 41. Pressurized pilot fluid from the pilot pump 41 is also communicated through the pilot line 66 thereby urging the diverter valve 62 to position in which the pressurized fluid from the ground driven pump 60 is transmitted to the reservoir 26 via the exhaust conduit 27 thereby isolating the steering control valves 21, 22 from the ground driven pump 60. It should be appreciated that by diverting operation fluid from the ground driven pump 60 to the reservoir 26, the backup steering control circuit 19 is rendered inoperative.

Industrial Applicability

In operation of the work machine 10, the processor 48 continuously monitors the signals from the work machine's sensors (i.e. the position sensor 55, the speed sensors 76, 77, 78, the angle sensor 79, and any other sensor associated with the work machine 10) in order to determine if each of the measured values associated therewith are within a respective predetermined parameter. If all of such signals are within their respective predetermined parameters thereby indicating that the primary steering control circuit 18 is operational, the processor 48 generates a control signal which is sent to the selector valve 86 thereby urging the selector valve 86 to a position in which pilot pressure is communicated through the pilot supply line 42 from the pilot pump 41. Pressurized pilot fluid from the pilot pump 41 is also communicated through the pilot line 66 thereby urging the diverter valve 62 to position in which the pressurized fluid from the ground driven pump 60 is transmitted to the reservoir 26 via the exhaust conduit 27 thereby isolating the steering control valves 21, 22 from the ground driven pump 60. It should be appreciated that by diverting pressurized fluid from the ground driven pump 60 to the reservoir 26, the backup steering control circuit 19 is rendered inoperative.

Steering with the primary steering control circuit 18 is initiated when the operator of the work machine 10 moves or otherwise positions the control handle 56 in the desired direction. An output signal commensurate with the direction and degree of movement of the control handle 56 is generated by the position sensor 55 and sent via the signal line 57 to the processor 48. The processor 48 processes the signal and dependent upon the steering mode selected (i.e. direction and degree of movement), generates an appropriate output signal on one or more of the signal lines 49, 50, 51, or 52.

For example, if the operator initiates a right-hand turn with the control handle 56 thereby placing the steering control circuit 20 in a first steering mode of operation, the processor 48 receives an output signal commensurate with the direction (i.e. right) and the degree of the right-hand turn from the position sensor 55. Thereafter, the processor 48 generates an output signal on the signal lines 49 and 51. The output signal on the signal line 49 actuates the proportional valve 43 thereby controllably directing pilot pressure to the actuation chamber 33 in order to move the steering control valve 21 leftwardly. At such a leftward position, the steering control valve 21 directs pressurized operation fluid from the supply line 24 through the directional flow control valve 101, the pilot valve 100, and to the hydraulic-powered differential 17 via the fluid line 120 thereby increasing rotational speed of the half shaft 103 and hence the wheel 106 while simultaneously decreasing the rotational speed of the half shaft 102 and hence the wheel 105. The difference in traction caused by the varying rotational speeds of the half shafts 102, 103 cause the front frame structure 12 to pivot about the pivot point 13 thereby causing the work machine 10 to execute a right-hand turn. Simultaneously, the output signal on the signal line 51 actuates the proportional valve 46 thereby controllably directing pilot pressure to the actuation chamber 38 in order to move the steering control valve 22 leftwardly. At such a leftward position, the steering control valve 22 directs pressurized operation fluid from the supply line 24 to the head end of the hydraulic cylinder 16 and the rod end of the hydraulic cylinder 15 via the fluid line 124. Such pressurized operation fluid causes the hydraulic cylinder 16 to assume the extended orientation, whereas the hydraulic cylinder 15 assumes the retracted position thereby causing the front frame structure 12 to pivot about the pivot point 13 thereby causing the work machine 10 to execute a right-hand turn.

Conversely, if the operator initiates a left-hand turn with the control handle 56 thereby placing the steering control circuit 20 in a second steering mode of operation, the processor 48 receives an output signal commensurate with the direction (i.e. left) and the degree of the right-hand turn from the position sensor 55. Thereafter, the processor 48 generates an output signal on the signal lines 50 and 52. The output signal on the signal line 50 actuates the proportional valve 44 thereby controllably directing pilot pressure to the actuation chamber 31 in order to move the steering control valve 21 rightwardly. At such a rightward position, the steering control valve 21 directs pressurized operation fluid from the supply line 24 through the directional flow control valve 101, the pilot valve 100, and to the hydraulic-powered differential 17 via the fluid line 122 thereby increasing rotational speed of the half shaft 102 and hence the wheel 105 while simultaneously decreasing the rotational speed of the half shaft 103 and hence the wheel 106. The difference in traction caused by the varying rotational speeds of the half shafts 102, 103 cause the front frame structure 12 to pivot about the pivot point 13 thereby causing the work machine 10 to execute a left-hand turn. Simultaneously, the output signal on the signal line 52 actuates the proportional valve 47 thereby controllably directing pilot pressure to the actuation chamber 36 in order to move the steering control valve 22 rightwardly. At such a rightward position, the steering control valve 22 directs pressurized operation fluid from the supply line 24 to the head end of the hydraulic cylinder 15 and the rod end of the hydraulic cylinder 16 via the fluid line 126. Such pressurized operation fluid causes the hydraulic cylinder 15 to assume the extended orientation, whereas the hydraulic cylinder 16 assumes the retracted position thereby causing the front frame structure 12 to pivot about the pivot point 13 thereby causing the work machine 10 to execute a left-hand turn.

During either the aforementioned right-hand turn or left-hand turn, the processor 48 may adjust the magnitude of the output signals on the signal lines 49, 50, 51, 52 in order to reduce (i.e. slow) the rate at which the angle of articulation of the work machine 10 is changing. In particular, the processor 48 compares the value of the rate at which the measured or actual angle of articulation of the work machine 10 is changing to the threshold value associated therewith, and thereafter adjusts the magnitude of the output signals on the signal lines 49, 50, 51, 52 if the measured or actual value equals or exceeds the threshold value.

Moreover, the processor 48 may adjust the magnitude of the output signals on the signal lines 49, 50, 51, 52 in order to prevent the work machine 10 from articulating beyond a threshold angle of articulation. In particular, the processor 48 compares the value of the measured or actual angle of articulation of the work machine 10 to a maximum or threshold angle of articulation value. Thereafter, the processor 48 may adjust the magnitude of the output signals on the signal lines 49, 50, 51, 52 in order to prevent the value of the actual angle of articulation of the work machine 10 from equaling or exceeding the threshold angle of articulation value.

If the operator positions the control handle 56 so as to direct the work machine 10 to advance in a straight direction (i.e. without executing either a right-hand turn or a left-hand turn), the processor 48 receives an output signal commensurate with the direction (i.e. straight) from the position sensor 55. In the presence of such a signal from the position sensor 55, the processor 48 does not generate an output signal on the signal lines 49, 50, 51, or 52. The absence of an output signal on the signal lines 49, 50, 51, and 52 positions the proportional valves 43, 44, 46, and 47 in their respective deactuated positions thereby causing the actuation chambers 31, 33 and the actuation chambers 36, 38 of the steering control valves 21, 22, respectively, to be isolated from the supply line 24.

Absence of pressurized operation fluid in either the actuation chamber 31 or the actuation chamber 33, causes the steering control valve 21 to assume a deactuated position (as shown in FIG. 2) thereby isolating the hydraulic differential 17 from the supply line 24. When the hydraulic-powered differential 17 is isolated in such a manner, rotational speed of the half shafts 102, 103 is unaltered by the rotary motor 108 thereby providing for straight advancement of the work machine 10.

Moreover, absence of pressurized operation fluid in either the actuation chamber 36 or the actuation chamber 38, causes the steering control valve 21 to assume a deactuated position (as shown in FIG. 2) thereby isolating the hydraulic cylinders 15, 16 from the supply line 24. When the hydraulic cylinders 15, 16 are isolated in such a manner, the hydraulic cylinders 15, 16 are prevented from assuming either the extended orientation or the retracted orientation (i.e. the hydraulic cylinders 15, 16 assume their respective neutral orientations) thereby providing for straight advancement of the work machine 10.

If the magnitude of any of the output signals from the position sensor 55, the speed sensors 76, 77, 78, the angle sensor 79, or any other sensor associated with the work machine 10 is outside of their respective predetermined parameter thereby indicating that the primary steering control circuit 18 has failed or otherwise become inoperative, or if the processor 48 itself fails, the control signal to the solenoid valve 86 is interrupted thereby causing the solenoid valve 86 to be biased to a backup position (as shown in FIG. 2). When the solenoid valve 86 is positioned in the backup position, the pilot supply line 42 is vented to the reservoir 26. This allows the diverter valve 62 to be spring biased to the operational position for communicating pressurized fluid from the ground driven pump 60 to the auxiliary supply conduit line 61.

Pressurized pilot fluid is then advanced to the pilot valve 100 via the supply conduit 104. Such pressurized pilot fluid from the ground driven pump 60 moves the valve 100 leftwardly thereby rendering the hydraulic-powered differential 17 inoperative, but allowing the rotary motor 108 to rotate freely. The freely rotating rotary motor 108 allows the powered differential to act as a free differential without a locking mechanism acting thereon.

The backup steering control circuit 19 is now operative to hydraulically control the position of the steering control valve 22. More specifically, if the operator initiates a right-hand turn with the control handle 56, the pilot control valve 68 directs pressurized pilot fluid to the actuation chamber 39 of the steering control valve 22 via the pilot line 73 in order to move the steering control valve 22 leftwardly. At such a leftward position, pressurized operation fluid from the auxiliary supply conduit 61 is directed to the head end of the hydraulic cylinder 16 and the rod end of hydraulic cylinder 15 via the fluid line 124. Such a direction of pressurized operation fluid causes the hydraulic cylinder 16 to assume the extended orientation, whereas the hydraulic cylinder 15 assumes the retracted position thereby causing the front frame structure 12 to pivot about the pivot point 13 thereby causing the work machine 10 to execute a right-hand turn.

Conversely, if the operator initiates a left-hand turn with the control handle 56, the pilot control valve 68 directs pressurized pilot fluid to the actuation chamber 37 of the steering control valve 22 via the pilot line 72 in order to move the steering control valve 22 rightwardly. At such a rightward position, pressurized operation fluid from the auxiliary supply conduit 61 is directed to the head end of the hydraulic cylinder 15 and the rod end of hydraulic cylinder 16 via the fluid line 126. Such a direction of pressurized operation fluid causes the hydraulic cylinder 15 to assume the extended orientation, whereas the hydraulic cylinder 16 assumes the retracted position thereby causing the front frame structure 12 to pivot about the pivot point 13 thereby causing the work machine 10 to execute a left-hand turn.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, it should be appreciated that the rear frame structure 14 may be configured with a hydraulic-powered differential similar to the hydraulic-powered differential 17 of the present invention so as to selectively alter rotational speed of the rear wheels 110, 111 thereby further facilitating articulation of the work machine 10.

Moreover, it should be appreciated that the wheels 105, 106, 110, and 111 of the present invention are not limited to a pneumatic rubber tire and rim assembly, but rather may also include other types of wheels. For example, the wheels 105, 106, 110, and 111 of the present invention may include a drive wheel or sprocket of a belt driven undercarriage assembly.

What is claimed is:

1. An articulating work machine, comprising:

a frame assembly having a first frame structure and a second frame structure, wherein (i) said first frame structure supports a first axle assembly having a first set of wheels secured thereto, (ii) said first frame structure is pivotally secured to said second frame structure at a pivot point, (iii) said frame assembly is positionable between an articulated orientation and an aligned orientation;

a fluid cylinder having a first end secured to said first frame structure and a second end secured to said second frame structure, wherein said fluid cylinder is positionable between an extended orientation and a neutral orientation;

a fluid-powered differential secured to said second frame structure, wherein (i) said fluid-powered differential includes a first half shaft and a second half shaft, (ii) said first half shaft and said second half shaft have a second set of wheels secured thereto, (iii) said fluid powered differential operates in either (A) a first differential mode of operation in which said fluid-powered differential causes said first half shaft to rotate at the same speed relative to said second half shaft, or (B) a second differential mode of operation in which said fluid-powered differential causes said first half shaft to rotate at a different speed relative to said second half shaft;

a steering control circuit for controlling direction of travel of said articulating work machine, wherein (i) said steering control circuit includes a processor, (ii) operating said steering control circuit in a first steering mode of operation causes said fluid cylinder to be positioned in said extended orientation and said fluid-powered differential to operate in said second differential mode of operation whereby said frame assembly is positioned in said articulated orientation, and (iii) operating said steering control circuit in a second steering mode of operation causes said fluid cylinder to be positioned in said neutral orientation and said fluid-powered differential to operate in said first differential mode of operation whereby said frame assembly is positioned in said aligned orientation; and an articulated angle sensor which is operatively coupled to said pivot point and said steering control circuit such that said articulated angle sensor (i) can measure an actual angle of articulation between said first frame structure and said second frame structure and (ii) communicate data indicative of said actual angle of articulation to said processor of said steering control circuit.

2. The work machine of claim 1, wherein said steering control circuit (i) detects when an actual angle of articulation between said first frame structure and said second frame structure equals a predetermined maximum angle of articulation, and (ii) prevents said actual angle of articulation from increasing beyond said predetermined maximum angle of articulation.

3. The work machine of claim 2, wherein said steering control circuit further detects speed of said work machine and limits a rate of change of a threshold angle of articulation based on said speed of said work machine.

4. The work machine of claim 3, wherein said steering control circuit further detects rotational speed of said second set of wheels and limits said rate of change of said threshold angle of articulation based on said rotational speed of said second set of wheels.

5. The work machine of claim 4, wherein said steering control circuit further detects rotational speed of said first half shaft of said fluid-powered differential and limits said rate of change of said threshold angle of articulation based on said rotational speed of said first half shaft.

6. The work machine of claim 1, wherein:

said first end of said fluid cylinder includes a rod, said second end of said fluid cylinder includes a housing which receives said rod therein, said housing is secured to said first frame structure, and said rod is secured to said second frame structure.

7. An articulating work machine, comprising:

a frame assembly having a first frame structure and a second frame structure, wherein (i) said first frame structure supports a first axle assembly having a first set of wheels secured thereto, (ii) said first frame structure is pivotally secured to said second frame structure at a pivot point, (iii) said frame assembly is positionable between an articulated orientation and an aligned orientation;

a fluid cylinder having a first end secured to said first frame structure and a second end secured to said second frame structure, wherein said fluid cylinder is positionable between an extended orientation and a neutral orientation;

a fluid-powered differential secured to said second frame structure, wherein (i) said fluid-powered differential includes a first half shaft and a second half shaft, (ii) said first half shaft and said second half shaft have a second set of wheels secured thereto, (iii) said fluid powered differential operates in either (A) a first differential mode of operation in which said fluid-powered differential causes said first half shaft to rotate at the same speed relative to said second half shaft, or (B) a second differential mode of operation in which said fluid-powered differential causes said first half shaft to rotate at a different speed relative to said second half shaft; and a steering control circuit having a processor and an articulated sensor, said articulated sensor being operatively coupled to said pivot point and said processor, wherein (i) said articulated sensor detects when an actual angle of articulation between said first frame structure and said second frame structure equals a predetermined maximum angle of articulation and (ii) said steering control circuit prevents said actual angle of articulation from increasing beyond said maximum angle of articulation.

8. The work machine of claim 7, wherein said steering control circuit further detects speed of said work machine and limits a rate of change of a threshold angle of articulation based on said speed of said work machine.

9. The work machine of claim 8, wherein said steering control circuit further detects rotational speed of said second set of wheels and limits said rate of change of said threshold angle of articulation based on said rotational speed of said second set of wheels.

10. The work machine of claim 9, wherein said steering control circuit further detects rotational speed of said first half shaft of said fluid-powered differential and limits said rate of change of said threshold angle of articulation based on said rotational speed of said first half shaft.

11. The work machine of claim 7, wherein:
said first end of said fluid cylinder includes a rod,
said second end of said fluid cylinder includes a housing which receives said rod therein,
said housing is secured to said first frame structure, and
said rod is secured to said second frame structure.

12. An articulating work machine, comprising:
a frame assembly having a first frame structure and a second frame structure, wherein (i) said first frame structure supports a first axle assembly having a first set of wheels secured thereto, (ii) said first frame structure is pivotally secured to said second frame structure, (iii) said frame assembly is positionable in an articulated orientation and an aligned orientation;
a fluid cylinder having a first end secured to said first frame structure and a second end secured to said second frame structure, wherein said fluid cylinder is positionable between an extended orientation and a neutral orientation;
a fluid-powered differential secured to said second frame structure, wherein (i) said fluid-powered differential includes a first half shaft and a second half shaft, (ii) said first half shaft and said second half shaft have a second set of wheels secured thereto, (iii) said fluid powered differential operates in either (A) a first differential mode of operation in which said fluid-powered differential causes said first half shaft to rotate at the same speed relative to said second half shaft, or (B) a second differential mode of operation in which said fluid-powered differential causes said first half shaft to rotate at a different speed relative to said second half shaft; and
a steering control circuit for (i) detecting speed of said work machine and limiting a rate of change of a threshold angle of articulation based on said speed of said work machine and (ii) for detecting when an actual angle of articulation between said first frame structure and said second frame structure equals a predetermined maximum angle of articulation and prevents said actual angle of articulation from increasing beyond said maximum angle of articulation.

13. The work machine of claim 12, wherein said steering control circuit further detects rotational speed of said second set of wheels and limits said rate of change of said threshold angle of articulation based on said rotational speed of said second set of wheels.

14. The work machine of claim 13, wherein said steering control circuit further detects rotational speed of said first half shaft of said fluid-powered differential and limits said rate of change of said threshold angle of articulation based on said rotational speed of said first half shaft.

15. The work machine of claim 12, wherein:

said first end of said fluid cylinder includes a rod, said second end of said fluid cylinder includes a housing which receives said rod therein, said housing is secured to said first frame structure, and said rod is secured to said second frame structure.

* * * * *